United States Patent [19]
Shear

[11] Patent Number: 5,627,972
[45] Date of Patent: May 6, 1997

[54] SYSTEM FOR SELECTIVELY CONVERTING A PLURALITY OF SOURCE DATA STRUCTURES WITHOUT AN INTERMEDIARY STRUCTURE INTO A PLURALITY OF SELECTED TARGET STRUCTURES

[75] Inventor: Timothy A. Shear, Novi, Mich.

[73] Assignee: RMS Electronic Commerce Systems, Inc., Livonia, Mich.

[21] Appl. No.: 238,612

[22] Filed: May 3, 1994

Related U.S. Application Data

[63] Continuation of Ser. No. 880,626, May 8, 1992, abandoned.
[51] Int. Cl.$^6$ .............................. G06F 5/00; G06F 13/00
[52] U.S. Cl. ................................................ 395/200.18
[58] Field of Search .................. 364/DIG. 1, DIG. 2; 395/200.18, 285, 286, 500, 800

[56] References Cited

U.S. PATENT DOCUMENTS

| | | | |
|---|---|---|---|
| 4,559,614 | 12/1985 | Peek et al. | 395/DIG. 2 |
| 4,595,911 | 6/1986 | Kregness et al. | 395/DIG. 1 |
| 4,791,558 | 12/1988 | Chaitin et al. | 395/DIG. 1 |
| 4,951,196 | 8/1990 | Jackson | 364/401 |
| 4,999,771 | 3/1991 | Ralph et al. | 395/DIG. 1 |
| 5,119,465 | 6/1992 | Jack et al. | 395/500 |

OTHER PUBLICATIONS

Grand "Overview of the e Language.", Premenos Corp (Aug. 30, 1991) pp. 1–10.

"EDI/e The Future of Business", Premenos Corp (1991) pp. 1–4.

EDI/e The Future of Business, "Redefining EDI" (1991) pp. 1–4.

*Primary Examiner*—Robert B. Harrell
*Attorney, Agent, or Firm*—John G. Chupa

[57] ABSTRACT

A data interchange system having a number of translators 50, 52, and 54, each adapted to translate a first message 16 to a second message 18.

2 Claims, 8 Drawing Sheets

```
88
 \  FD TRANS-FILE.
  \  01 TRANS-RECORD.
92 ———— 03 TRANS-REC CODE          PIC X(01).
94 ———— 03 TRANS DATA              PIC X(34).
       03 TRANS-HEADER-REC         REDEFINES TRANS-DATA
96  98 ———— 05 TRANS-INVOICE-NO    PIC X(15).
   100 ———— 05 TRANS-INVOICE-DT    PIC 9(06).
   102 ———— 05 TRANS-VENDOR-CODE   PIC X(10).
   104 ———— 05 FILLER              PIC X(03).
90 ———— 03 TRANS-DETAIL-REC        REDEFINES TRANS-DATA
   106 ———— 05 TRANS-PART-NO       PIC X(15).
   108 ———— 05 TRANS-QTY           PIC 9(08).
   110 ———— 05 TRANS-PRICE         PIC 9(08).9(02).
```

Fig-13

```
;;;;;;;;;;;;;;;;;;;;;;;;;;;;;;;;;;;;;;;;
;; fixed length record access model
;;;;;;;;;;;;;;;;;;;;;;;;;;;;;;;;;;;;;;;;
ANSI_chars = ?(['A'..'z','0'..'9','.','+','-','/',
      '@', '['.. ', '[..'~'])*?
ANSI_all_chars = ?([' '..'~'])*?
;;delim = ?('+')?
Rec_delim = ?(10)?
AlphaNumericFld = ?^(ANSI_chars)?
DateFld = ?^(#DATE)?
TimeFld = ?^(#TIME)?
NumericFld = ?^(NUMERIC)?
IDFld = ?^(ANSI_chars)?
;;;ElementX12 = ?(ANSI_all_chars)?
Rec_Type = ?( (ANSI_chars) {3 .. 3})?
Record = ( %Rec_Type )^(AlphaNumericFld || DateFld ||
TimeFld || NumericFld || IDFld ) ( Rec_delim )
;;;;;;;;;;;;;;;;;;;;;;;;;;;;;;;;;;;;;;;;
;;;report output print line
;;;
Line_Feed = ?(10)?
FieldAn = ?(ANSI_chars)?
?FieldN = ?(#NUMERIC)?
Print_Ln = ?(FieldAN || FieldN) (Line_Feed)
```

```
;;; (/usr/dts/example.mdl)
;;; (version 1.00)
;;; (type = TARGET)
;;; Written Tue Mar 17 14:02:17 1992
;;;     by user: anon
;;; CAMS(tm) Interchange Format. (c) Copyright 1991 RMS.
;;; 1048575
TransRecs {
InvoiceHeaderRec { Record "1"
InvoiceNo { AlphaNumericFld @15 .. 15 none
[]
InvoiceNo = M_L->Invoice_No
} *1 .. 1
InvoiceDate { DateFld @6 .. 6 "The date is MM/DD/YY" none
[]
InvoiceDate = M_L->Invoice_Date
} *1 .. 1
InvoiceVendorNo { AlphaNumericFld @10 .. 10 none
[]
InvoiceVendorNo = M_L->Supl_Code
} *1 .. 1
} *1 .. 1 ;; |-- end InvoiceHeaderRec --|
LineItemLoop { SORT LineItemPartNo, LineItemQtyShp
LineItemRec { Record "2"
LineItemPartNo { AlphaNumericFld @15 .. 15 none
[]
LineItemPartNo = M_L->Vendor_Item_No
} *1 .. 1
LineItemQtyShp { NumericFld @8 .. 8 "99999999" none
[]
LineItemQtyShp = M_L->Quantity
} *1 .. 1
LineItemPrice { NumericFld @11 .. 11 "ZZZZZZ9.99" none
[]
LineItemPrice = M_L->Unit_Price * M_L->Quantity
} *1 .. 1
} *1 .. 1 ;; |-- end LineItemRec --|
} *1 .. 1 ;; |-- end LineItemLoop --|
} *1 .. 1 ;; |-- end TransRecs --|
```

SYSTEM FOR SELECTIVELY CONVERTING A PLURALITY OF SOURCE DATA STRUCTURES WITHOUT AN INTERMEDIARY STRUCTURE INTO A PLURALITY OF SELECTED TARGET STRUCTURES

This is a continuation of application Ser. No. 07/880,626 filed on May 8, 1992, now abandoned.

BACKGROUND OF THE INVENTION

1. Field of the Invention

This invention relates to a data interchange system and, more particularly, to a computer system that is adapted to communicate and translate data between various computer systems.

2. Discussion

Data interchange systems are used to allow at least one computer system that is adapted to process data having a first data structure, to communicate this data with at least one other computer system, adapted to process data, having a second and dissimilar data structure or format. More particularly, the interchange system transforms or translates data having a first structure, into a targeted data structure format, which is communicated to the target computer system. Moreover, while these prior interchange systems have adequately allowed for the transformation of dissimilar data structures, they have suffered from a number of drawbacks.

Most of these prior systems have used a "dictionary structure technique", for describing the translation of messages. More particularly, this techniques requires that a received message be separated into a fixed number of hierarchical levels, each being associated with a unique dictionary. This dictionary is then used to translate or transform the associated hierarchical data structure level, into a corresponding target structure. While effective in some situations, this technique fails to achieve the desired transformation if the message format requires more hierarchical levels than there are dictionaries available. In this situation, the incoming messages are not properly translated and the interchange system fails to provide the desired communication.

Moreover, these dictionaries are often of a fixed format, corresponding to specific types of messaging or data structure formats which are allowed to be translated. Should other types of structured messages be received by these prior interchange systems, the received messages fail to become translated and the desired communication does not occur. Therefore, these prior interchange systems are incapable of accepting new or other types of data formatted messages, which have not been previously described.

Moreover, many of these prior data interchange systems directly map or "couple" the definition of the translating or mapping functions between each source and target message. Therefore, should new message formats be desired, or current formats modified, a sizable effort is required to change the entire source and target mapping arrangement. Therefore, should additional formats be desired, a large amount of time and effort is wasted in adding these new structures to the previously defined system. Moreover, many of these systems requires a different methodology or manner of message specification, requiring a great deal of effort upon the part of the designer or user and further adding to the overall inefficiency and undesirability of these systems. Lastly, many of these prior interchange systems require that the mappings or translations be performed at the time that the source message or data is found, and do not allow the data to be withheld until a later time. This timing constraint requires a relatively complex and inefficient system scheduling operation, and further increases the overall transformation time associated with these systems.

There is therefore a need to provide a data interchange system which allows various types of data formats to be translated and received by targeted systems. Moreover, there is a further need to allow this provided data interchange system to be easily adaptable and operable with a variety of data structures, and to allow the interchange system to efficiently transform these data structures from one format to another.

SUMMARY OF THE INVENTION

It is therefore, a primary object of this invention to provide a data interchange system that is adapted to translate or transform a first message, having a first data format, into a second message, having a second and dissimilar data format or structure.

It is another object of this invention to provide a data translator, adapted to process a wide variety of dissimilar data structure messages, and which is easily modifiable, effective to relatively easily allow previously defined data formats to be modified and changed as desired.

It is yet a further object of this invention to provide a data interchange system, adapted to receive a message having a first data format, to receivably store the first message, and to translate the received message into a second data structure or format, at a predefined time later.

It is yet a further object of this invention to provide a distributed translator system, having a number of translators, each adapted to transform or translate a data message having a first data format, into a second data message having a second data format.

According to a first aspect of the present invention, a data interchange system is provided. More particularly, the interchange system includes a translator adapted to transform or translate a first data message having a first format, into a second data message having a second format.

Further objects, features and advantages of the present invention will become apparent from a consideration of the following description and claims, when taken in conjunction with the accompanying drawings.

BRIEF DESCRIPTION OF THE DRAWINGS

Various advantages of the present invention will become apparent to those skilled in the art by reading the following specification and by reference to the following drawings in which.

DETAILED DESCRIPTION OF THE INVENTION

Figure 1:
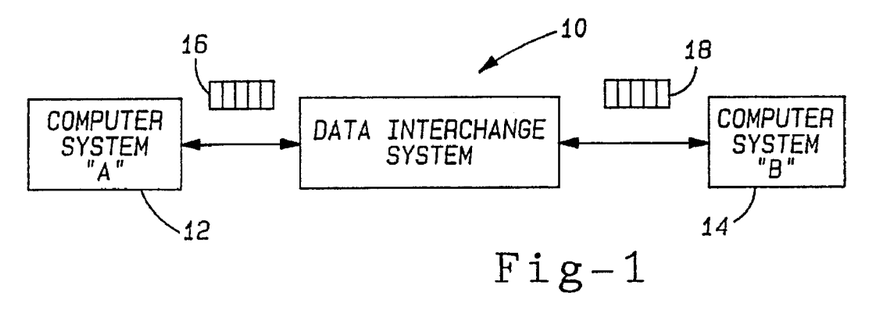
FIG. 1 is a block diagram of the data interchange system of the present invention, shown in communication relationship to typical computer systems.
Figure 2:
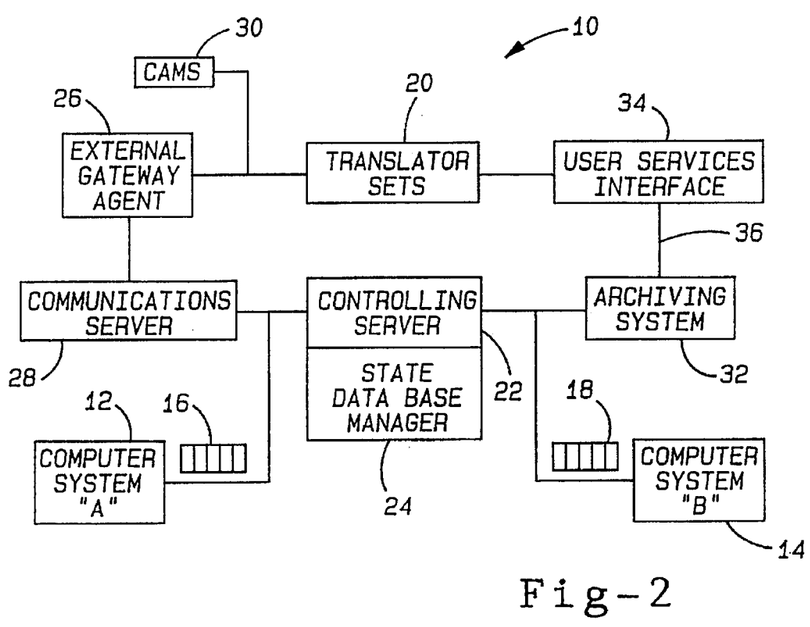
FIG. 2 is a block diagram of the data interchange system shown in FIG. 1.

Referring now to FIGS. 1 and 2, there is shown data interchange system 10, made in accordance with the teachings of the preferred embodiment of this invention. As shown, data interchange system 10 is bi-directionally and communicatively coupled to a first computer system 12 and a second computer system 14. Moreover, interchange system 10 is adapted to receive at least one data message 16, from computer system 12, arranged in a first data structure or format. Upon receipt of message 16, interchange system 10 is further adapted to translate or transform message 16, into the format or data structure utilized by computer system 14. This restructured or translated message 18 is then output to computer system 14, in a manner to be described. It should be apparent to one of ordinary skill in the art, that messages may alternatively be received by system 14 and output to system 12, in substantially the same and previously described manner. Moreover, it should further be apparent to one of ordinary skill in the art that interchange system 10 is adapted to communicatively couple a variety of computer systems in the manner previously described.

As shown best in FIG. 2, interchange system 10 includes a number of translators 20 which are adapted to perform these translations or data transformations in a manner to be described, and a controlling server 22 which manages the translations performed by translators 20. Moreover, system 10 further includes a state database manager 24 which allows a user to configure various data models which will be described later. Further, system 10 includes an external gateway agent 26, and a communication server 28, which are respectively adapted to allow the controlling server 22 to be coupled to external networks and "dial out networks". System 10 further includes a computeraided modeling system 30, which facilitates the creation of the needed models, necessary for the interchange to occur, an archiving system 32, which allows for the selective storing of message 16, 18, and a user services interface portion 34, which allows a user to efficiently and easily interact with system 10. Moreover, a messaging system 36 is communicatively coupled to translators 20; server 22; agent 26; server 28; modeling system 30; archiving system 32; and user services interface portion 34, and is adapted to allow data to be interchanged among and across these nodal entities.

Figure 3:
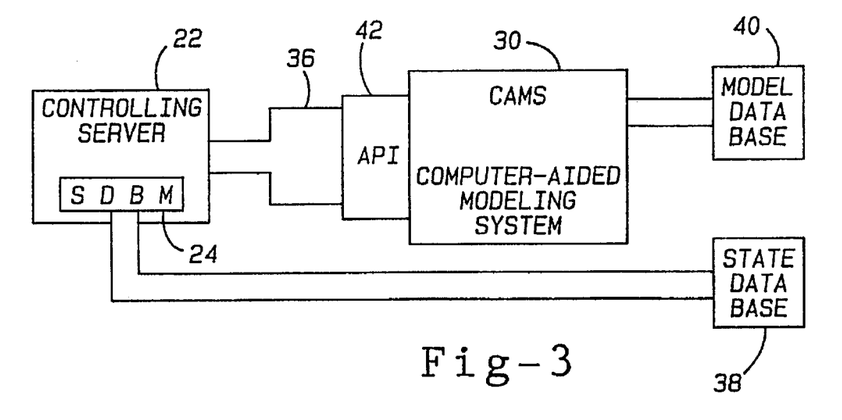
FIG. 3 is a block diagram of the computeraided modeling system, shown in FIG. 2, in communication relationship with the controlling server and model and state databases of the data interchange system of the present invention.

Referring now to FIG. 3, there is shown the computeraided modeling system 30, in communication relationship with controlling server 22 and state database manager 24. As shown, manager 24 includes a state database 38 which contains, as will be explained later, information specific to the targeted computer system 14, and required in the translation or transformation process. More particularly, database 38 consists of or includes user defined references which define access to transformed or related data. As further shown, modeling system 30 includes a model database 40 which is adapted to include, as will be shown, various data models associated with the hierarchical level of message 16. In the preferred embodiment of this invention, these included data models are used to parse and transform message 16 into the format utilized by message 18. Moreover, and as further shown, modeling system 30 is coupled to messaging system 36 by use of an application programming interface 42. In a preferred embodiment of this invention, interface 42 allows for controlling server and state database managers 22, 24 to communicate through messaging system 36, to agent 26; server 28; modeling system 30; archiving system 32; and user services interface 34.

Figure 4:
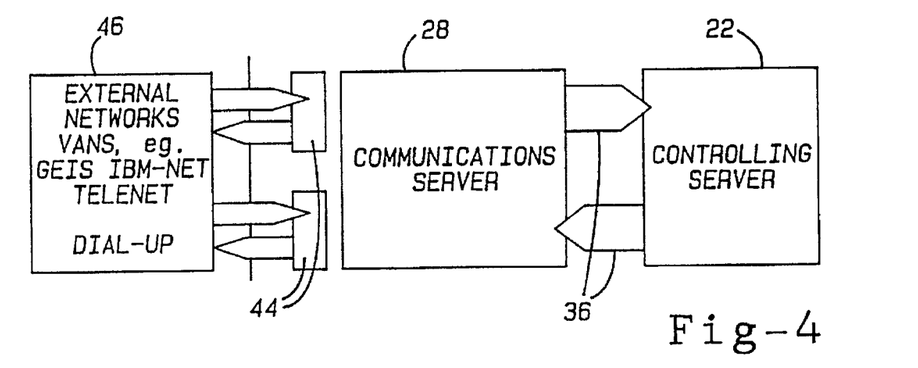
FIG. 4 is a block diagram showing the communication relationship between the communication server of the present invention and a variety of external communication networks.

Referring now to FIG. 4, there is shown controlling server 22 communicatively coupled to communications server 28, by means of messaging system 36. In the preferred embodiment of this invention, server 28 utilizes commercially available communication packages, such as the commonly known Telenet and other value added dial-up network packages 44. These packages then cooperate with server 28 to allow data to be bi-directionally communicated to and from server 22, across a variety of communication networks 46.

Figure 5:
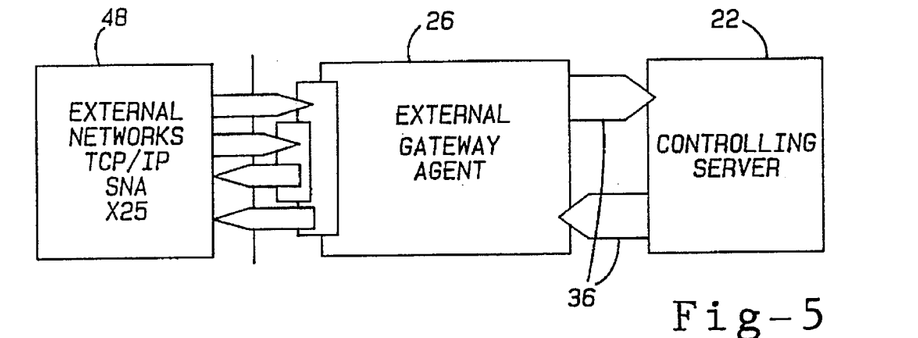
FIG. 5 is a block diagram illustrating the communication relationship between the external gateway agent of the present invention and a variety of external communication networks.

Referring now to FIG. 5, there is shown controlling server 22 in communication relationship with gateway agent 26, by means of messaging system 36. As shown, agent 26 is coupled to a variety of external databases resident on commercially available package switch networks such as X.25, the IBM SNA network, or the commonly used and commercially available TCP/IP networks 48. Particularly, agent 26, in the preferred embodiment of this invention, acts as a typical and known communication agent, for server 22 whenever server 22 is required to communicate with one of the external networks 48. Moreover, in the preferred embodiment of this invention, agent 26 is adapted to spawn processes, effective to obviate the need to halt or interrupt server 22, while awaiting connection or response signals from networks 48. Moreover, in the preferred embodiment of this invention, substantially all external database accesses are routed through agent 26.

Figure 8:
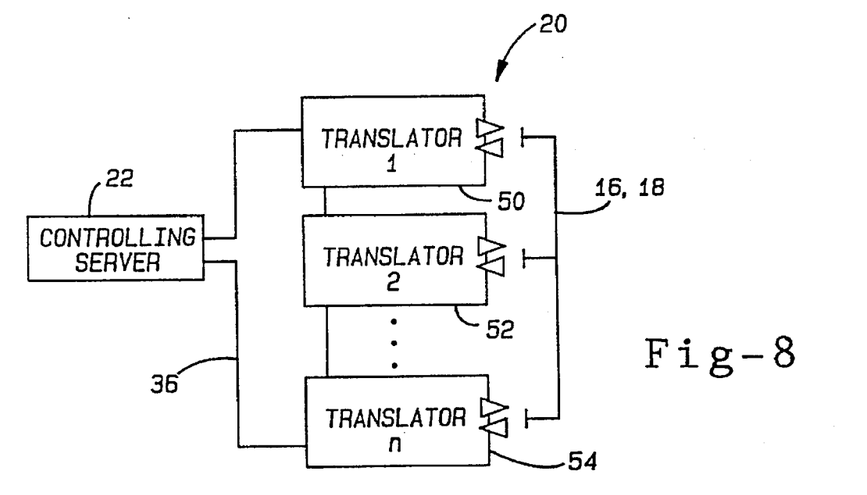
FIG. 8 is a block diagram illustrating the communication relationship between the controlling server and translators of the interchange system of the preferred embodiment of this invention.

Referring now to FIG. 8, translator system or sets 20 is shown in communication relationship with server 22, by means of messaging system 36. As shown, translator system 10 may comprise a number of unique and distinct translators 50, 52, and 54. Moreover, each of the translators 50, 52, and 54, as shown, is adapted to receive output messages 16, 18 which are translated or transformed from a first message format or structure into a second and dissimilar message format or structure. In this manner, a first computer system 12 may effectively communicate messages to a second computer system 14, even though computer systems 12 and 14 utilize unique and dissimilar message structures or data formats.

Figure 6:
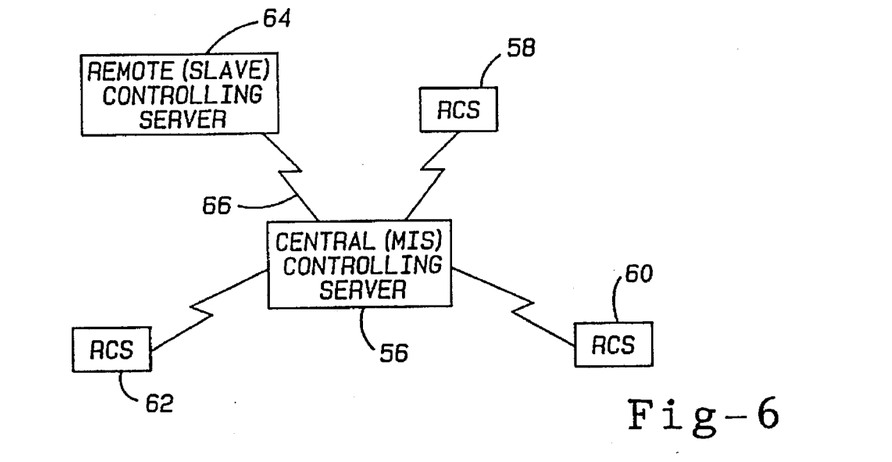
FIG. 6 is a block diagram illustrating the use of several remote control servers, according to a second aspect of the present invention.
Figure 7:
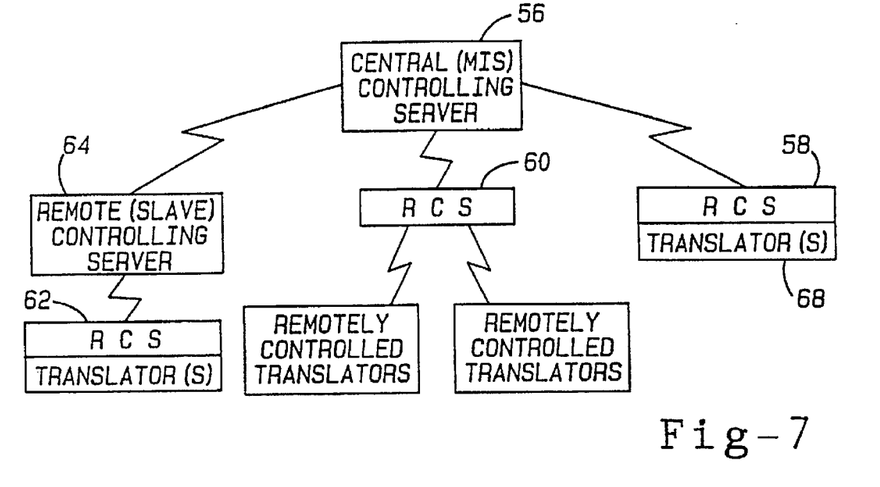
FIG. 7 is a block diagram illustrating the use of a number of remotely controlled translators, according to a third embodiment of the present invention.

Referring now to FIG. 6, according to a second embodiment of this invention, a centralized controlling server 56 may be used to control a number of remote controlling servers 58, 60, 62, and 64, over a variety of commercially available and typical wide area networks such as X.25 and ISDN. In this arrangement, translations may still be achieved via translator systems 20, coupled to server 56 in the previously described manner, though data may be received by these translator systems through these wide area networks 66. In yet a third embodiment of this invention, as shown best in FIG. 7, each remote control server 58, 60, 62, and 64 may be adapted to have separate translator systems 68, effective to allow translations or data transformations to occur remote from the central controlling server 56. This distributed translation arrangement or configuration allows for a wide variety of remote systems to communicate with a central computer system.

Figure 10:
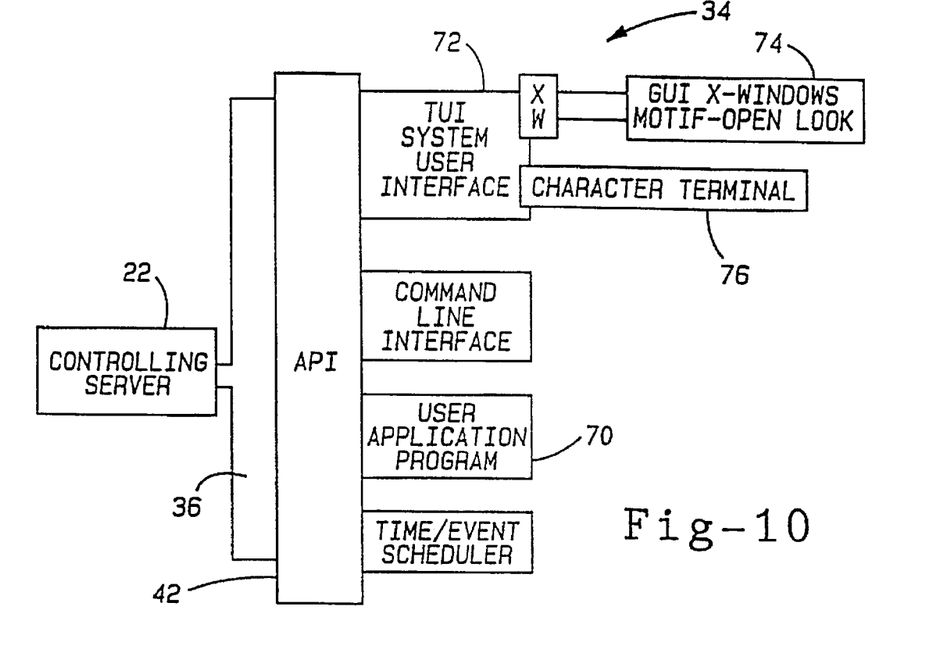
FIG. 10 is a block diagram illustrating the user services interface, shown in FIG. 2.

Referring now to FIG. 10, there is shown the user services interface portion 34 of the present invention. As shown, the application program interface 42 provides a library of function calls facilitating an integration of user defined application programs 70, to be used within system 10. Moreover, interface portion 34 includes a translation user interface subsystem 72 which, in the preferred embodiment of this invention, is adapted to allow a user to efficiently and relatively easily interact with system 10. Moreover, in the preferred embodiment of this invention, system interface portion 72 includes a graphical user interface portion 74 having a number of commercially available and compatible window interface software modules, which allows portability to most commercially available graphical user interface windowing systems. In the preferred embodiment of this invention, the graphical user interface portion 74 includes MS DOS; OS/2; SVB UNIX; VMS; MAC OS; and various other operating systems. Moreover, the graphical user interface 74, according to the teachings of the preferred embodiment of this invention, further utilize MS windows, OSF MOTIF; ATT/SUN Open Look; DEC windows; X windows; Presentation Manager; as well as various MacIntosh graphics systems. The user interface 72, further includes a portion adapted to allow a typical and commercially available character terminal 76 to communicate with system 10 and to relatively easily allow a user to interact with system 10.

Figure 9:
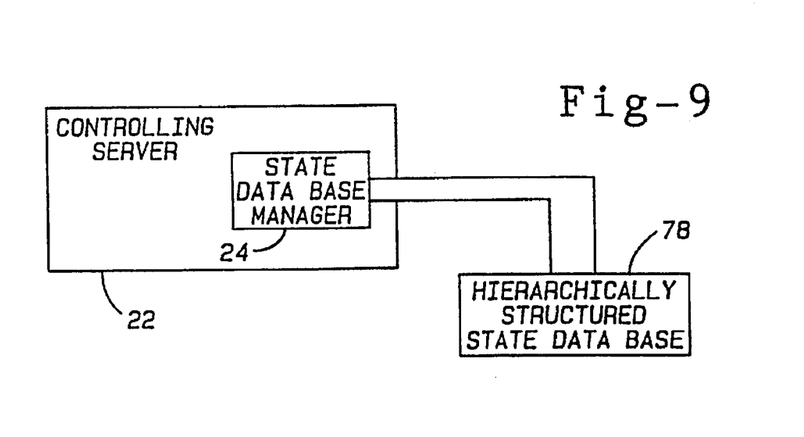
FIG. 9 is a block diagram illustrating the communication relationship between the controlling server and state database of the interchange system of the preferred embodiment of this invention.

Referring now to FIG. 9, there is shown controlling server 22, made in accordance with the teachings of the preferred embodiment of this invention, and further including a previously described state database manager 24 coupled to a hierarchically structured state database 78, whose use will now be explained in connection with the operation of system 10.

Figure 11:
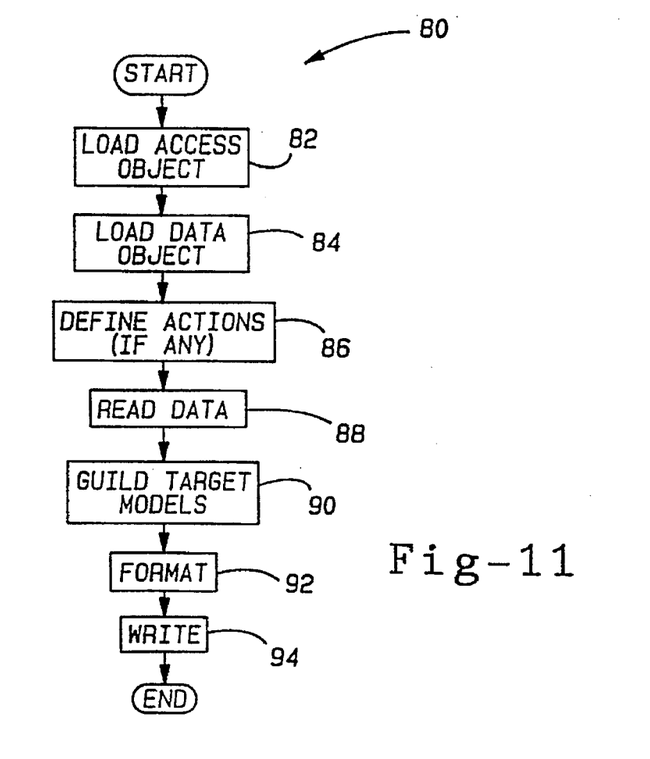
FIG. 11 is a flowchart illustrating the sequence of operational steps associated with the operation of the data interchange system shown in FIG. 1.

Referring now to FIG. 11, there is shown a flowchart 80, comprising a sequence of steps associated with the operation of the data interchange system 10, according to the teachings of the preferred embodiment of this invention. As shown, flowchart 80 includes an initial step 82 in which the access object or model, associated with the source message 16 (and also for the target message) is created and stored in translator system 20. According to the teachings of the preferred embodiment of this invention, the access model is adapted to recognize data objects which are described in step 84. This data object recognition is accomplished by various pre and post conditions which occur in relation to the desired data object, contained within message 16. Specifically, according to the teachings of the preferred embodiment of this invention, there are four base types of access conditions which the access model may recognize. These condition types are as follows:

(1) Quoted Character—allows the translator to read, write, and test for one character included within the source message 16.

(2) Numerical Definition—allows a translator to read, write, and test for one byte of data based upon a numerical byte value.

(3) Set Type—allows translator 20 to read, write, and test for a single character based upon a range of predefined and preselected character values.

(4) In Built Function—allows a user to direct the translators to invoke other access methodologies (i.e. supplied by a user or developer) such as date, time, or other numerical values.

It should be apparent to one of ordinary skill in the art, that in the preferred embodiment of this invention, translator system 20 is also adapted to logically concatenate these various access model types, in logical "or" "and" operation. Moreover, the preconditions could also be modified, in the preferred embodiment of this invention, effective to allow a match or recognition to be indicated only if the data matches a predefined match value in the data model. Moreover, according to the teachings of the preferred embodiment of this invention, each translator system 10 includes a separate counter (not shown) which is incremented substantially every time that each of the data objects is recognized. Moreover, each of the objects are associated with a unique data object counter which allows translators 20 to determine the number of data object occurrences. Moreover, it should further be apparent to one of ordinary skill in the art, that this previously described access model definition, associated with the source message 16, is "de-coupled" and totally independent from the access model and data structure definition of the targeted message 18. In this manner, this de-coupled computer architecture allows for interchange system 10 to interact and transform a wide variety of dissimilar source messages 16, into a wide variety of desired and specific data structures 18.

Figure 13:
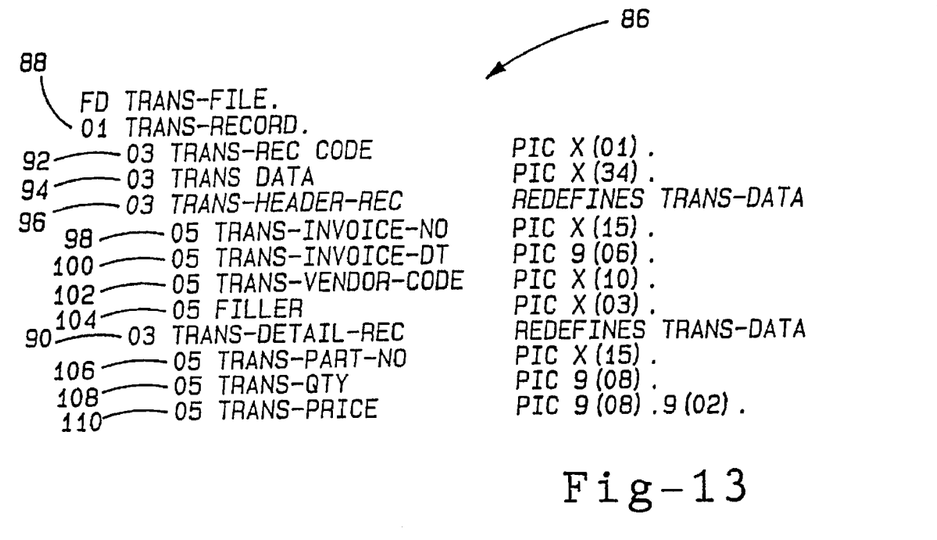
FIG. 13 is a typical user requirement listing.
Figure 14:
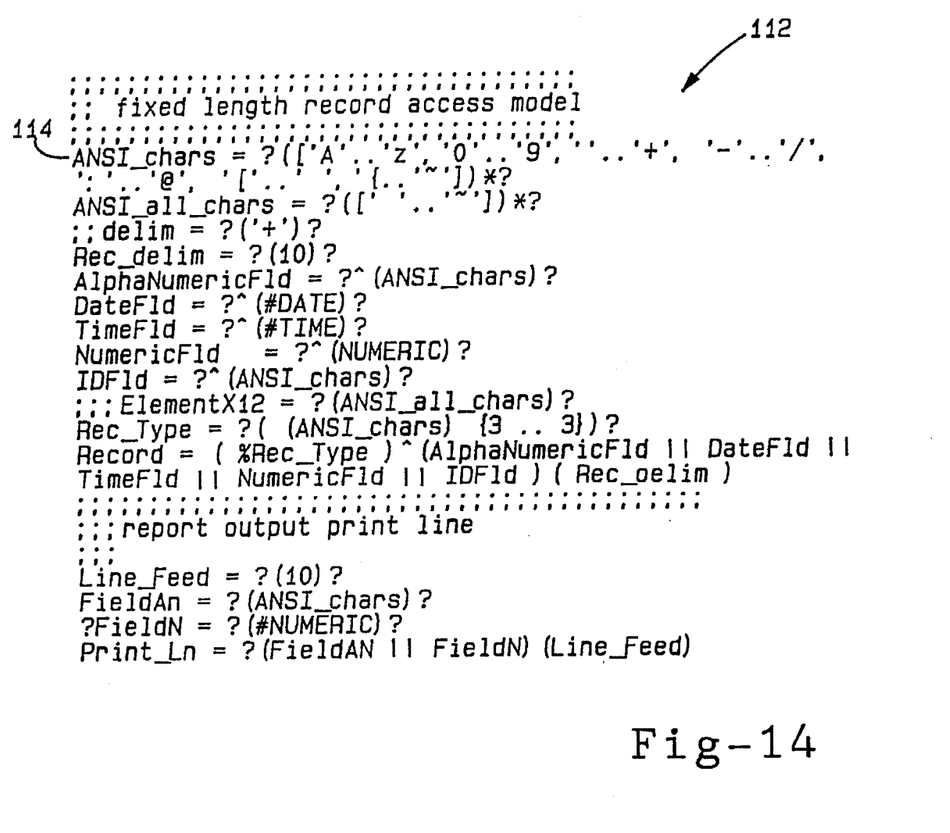
FIG. 14 is a typical access model associated with the user listing shown in FIG. 13.

To further understand the structure of the access model and object, associated with step 82, reference is now made to FIGS. 13 and 14. As shown in FIG. 13, before system 10 may be utilized, a set or structure of user requirements 86 must be accomplished. These requirements, normally accomplished in the "start step" 82 of flowchart 80, map or recognize the various portions of each of the messages 16. That is, messages 16 are normally associated with a specific document or data grouping, having various components. In the example shown in listing 86, this data grouping is associated with a translation file. Specifically, in this user requirement, there are two main portions associated with this file, that of a record and a record detail 88, 90 respectively. The record portion 88, includes a record code 92, some transactional data 94, and a header 96.

More particularly, the header 96 includes a transaction invoice number 98, and invoice date 100, a vendor code 102, and filler or descriptive text 104. Detail record 90 includes a part number portion 106, a quantity portion 108, and a price portion 110. It should be apparent to one of ordinary skill in the art, that various records or documents may be subdivided into their constituent elements, in the manner previously described. Moreover, it should further be apparent to one of ordinary skill in the art, that the user requirements listing 86 is of a hierarchical nature, in which various bottom tiered elements or components are related or associated with the higher level portions. In this manner, a plethora of user defined records may be hierarchically modeled in substantially similar manners, to list or map the various user requirements associated with substantially every message 16 emanating from a source computer system 12.

Figure 12:
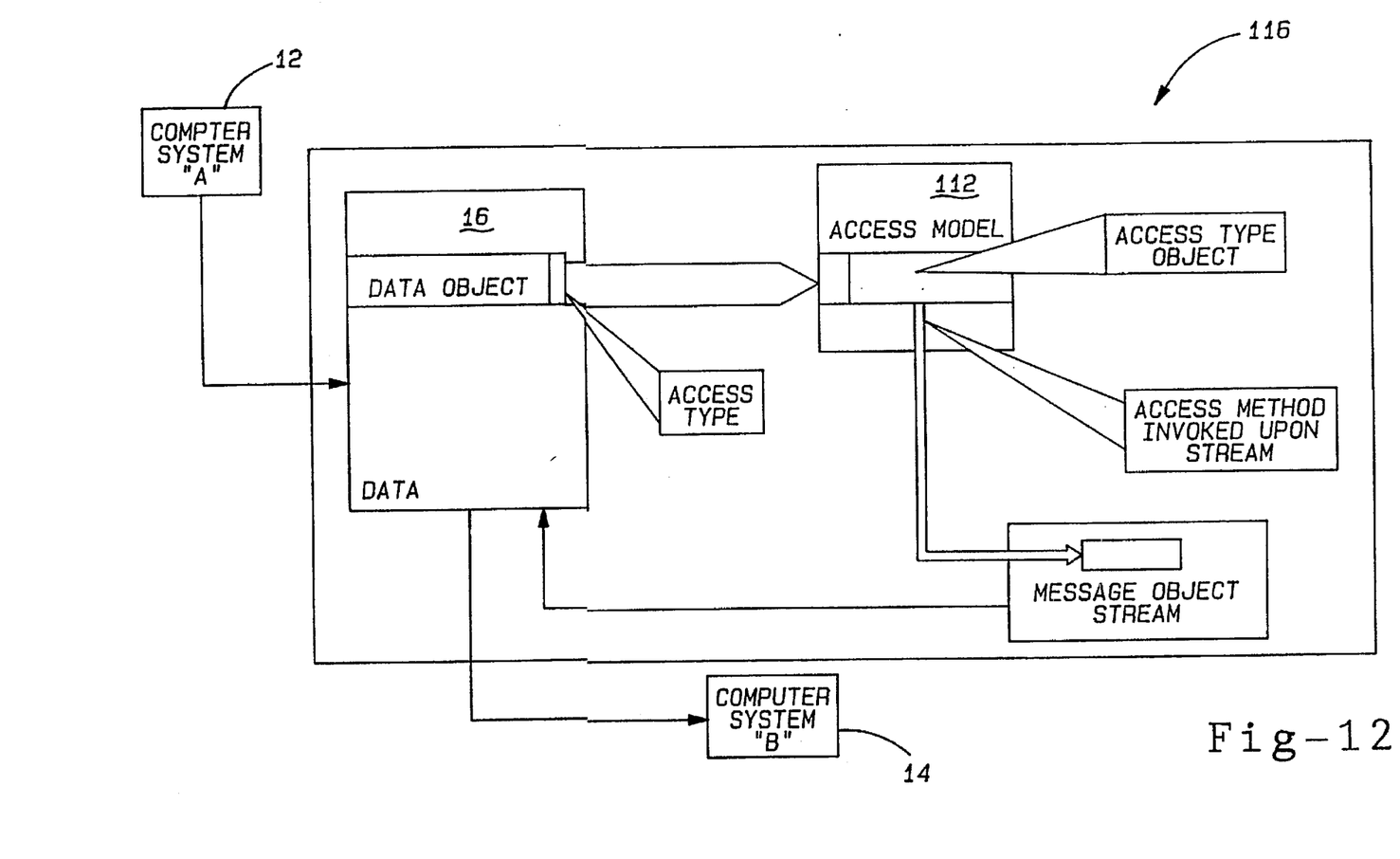
FIG. 12 is a flow diagram illustrating the operation of the translator system, shown in FIG. 1 and described in FIG. 11.

Referring now to FIG. 14, there is shown an access model 112, associated with user listing 86 and made in accordance with the teachings of the preferred embodiment of this invention. As shown, access model 112 associates every portion 88–110 with a specific declaration 114, associated with each of the portions 88–110. In this manner, the access model will access the declaration to test for the occurrence of one of the objects 88–110, defined in listing 86. Such testing is graphically shown in block diagram 116 of FIG. 12. As shown, the data structured message 16 is received by translator system 12 and access model 112 is adapted to invoke the previously described recognition methodology upon the received message. The recognized message is then subjected to the data model before the value is output, in a manner to be described.

In a preferred embodiment of this invention, the data model, associated with step 84, comprises two portions. That is, each component of the data model structure is referred to as an "object", and the object is defined by a declarative statement. In a preferred embodiment of this invention, there are three types of declared objects. These types are as follows:

(1) Defining Object—A defining object is the "lowest level object" in the structure and it is adapted to define the representation associated with a string of characters, such as date, time, an alpha numeric field, or record code.

(2) Tag Object—Tag objects are used, in the preferred embodiment of this invention, to recognize a collection or grouping of defining objects that can be identified in the data stream by a matching value such as a tag. Two commonly used tag objects are records (with corresponding tag record code) and segments (with a corresponding segment record tag). The matching value, according to the teachings of the preferred embodiment of this invention, is specified in the corresponding data model in which the tag object is used.

(3) Grouping Object—Grouping objects are used to define a group of tags, defining, and other grouping objects. That is, when the data structure allows for objects to repeat or reiterate upon themselves, or loop or concatenate together with other objects, the grouping object is used to define this corresponding looping or concatenation relationship.

According to the further teachings of the preferred embodiment of this invention, once a user defines the type of object that is necessary, the specific object implementation at this unique position in the data structure or model is normally specified by a maximum or minimum size, format, a maximum or a minimum occurrence, or other range of numerical values. According to the further teachings of the preferred embodiment of this invention, assertions are used within the data model to specify manipulations that can be associated with any data model object. Three sets of assertions are normally provided and are associated with the object recognition, object absence, and an error condition.

That is, if the data model object is recognized within the data message or stream 16, the mode defined by the data model is that of "present". If the current object is not recognized but not required, the mode is determined to be "absent". However, if the data object is not recognized and required within the stream, an error condition is flagged. Once the mode is determined by the data structure, the declared assertions for the unique type of mode determined are then executed.

Figure 15:
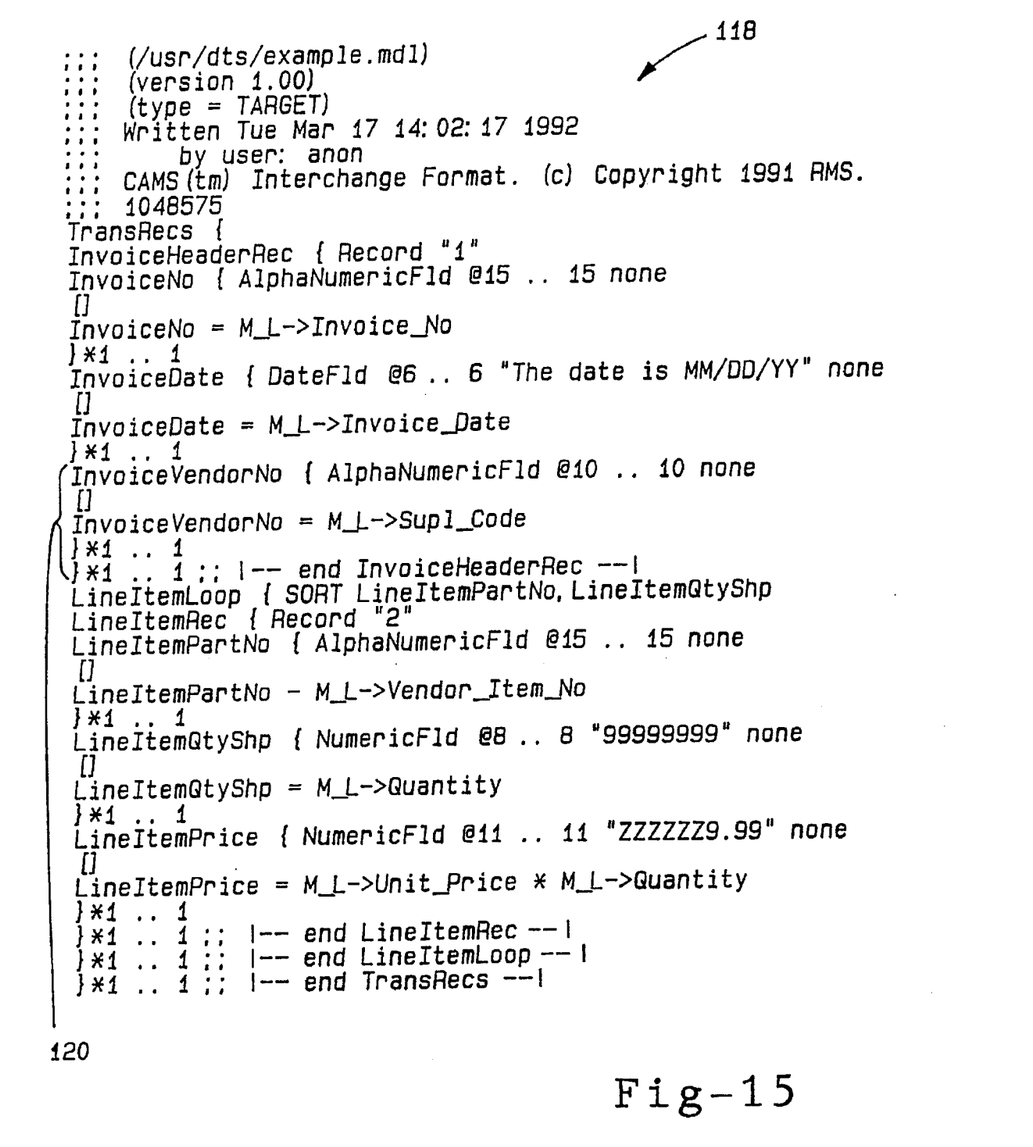
FIG. 15 is a typical data model, uniquely associated with the user requirements of FIG. 13 and the access model of FIG. 14.

According to the teachings of the preferred embodiment of this invention, assertions comprise two parts, the condition and the action. Moreover, the condition specifies when the actions are to be performed and may in fact, comprise a number of actions which are logically associated with each other by the logical operators of "and" and "or". To further understand the use of a data model according to the teachings of the preferred embodiment of this invention, reference is now made to the typical data model 118, shown in FIG. 15 and uniquely associated with user requirement listing 86 and access model 112. As shown, each of the user objects 88–110 uniquely corresponds to a specific portion 120 of the data model. In this manner, it should be apparent to one of ordinary skill in the art, that various source data objects 88–110 are received and recognized by system 110 and, upon such recognition, a number of assertion outputs are generated and transmitted from system 10.

The source data model object values are then assigned to an array of variables which are then assigned to target data model objects. Each of these variables provides a semantic linkage between the data model object values and the target data model objects and provides a one to many or many to one mapping. This semantic linking provides a one to many and many to one mapping, minimizes the impact of data structure modifications, and substantially eliminates the need for a developer or user to truly understand the structures associated with computer systems 12 and 14. Moreover, this variable mapping further de-couples the source and target transformation process, thereby allowing for independent translations of each of the source and target systems.

Referring again to FIG. 11, these actions or assertions are shown in step 86. In step 86, the data values of each of the data model elements are mapped to these variables. The data is continually read in, as shown in step 88, for a length determined by the data model. Target models are then built in step 90, corresponding to the data format associated with computer system 14. After the target models are built, these models are used to format the data, in step 92, according to the structure used by system 14. The formatted data, shown as message 18, is then written to system 14.

In order to map the value occurrences to these variables, a number of rules are followed in the preferred embodiment of this invention. That is, the target model is normally followed in this mapping procedure, with the objects having the lowest level source object values determining the target loop occurrences. Source object levels in each value occurrences in each loop are checked by each of the translators 20.

However, this general rule is overridden by the following occurrence. That is, these variable or "metalink" objects store value occurrences in source object information, with the last occurrence being pointed to by a value pointer. The following algorithm determines when to advance the pointer. If the pointer is not advanced, the current occurrence is used. This algorithm is as follows:

(1) Next non-controlling target object occurrence may come from higher level source object if source object level is less than or equal to current target controlling level.

(2) No next occurrence if target level is less than or equal to current controlling source level object, i.e., higher in hierarchy and occurrences do not match. In this case value is repeated for all loop occurrences till next loop iteration.

(3) Related loops in source and target must have equal occurrences, otherwise in error.

(4) If two controlling objects at the same level in source control two objects at different levels in target, must merge all like valued occurrences (if denoted as unique).

(5) If source object is lower in hierarchy than its receiving target object and is controlling object and only one occurrence of higher levels, higher level objects must repeat in same frequency as lower level.

The output of the target side mapping is a linear array of values occurring in the sequence that they were generated within. This output is called a value stack array. When sorting is specified, a parallel array or structure is maintained and the structure is adapted to track the iteration occurrences of the output data. The target object that is sorted contains a pointer to a sort control structure. The structure tracks beginning and ending sort element structures and memory areas used to store sorted values. Each sort element structure tracks beginning and ending pointers into the value stack array of the occurrences they track. Also contained are pointers to other multi-level sorting occurrences. In this manner, it should be apparent to one of ordinary skill in the art that these data occurrences may be efficiently and accurately translated and communicated to computer system 14.

Figure 16:
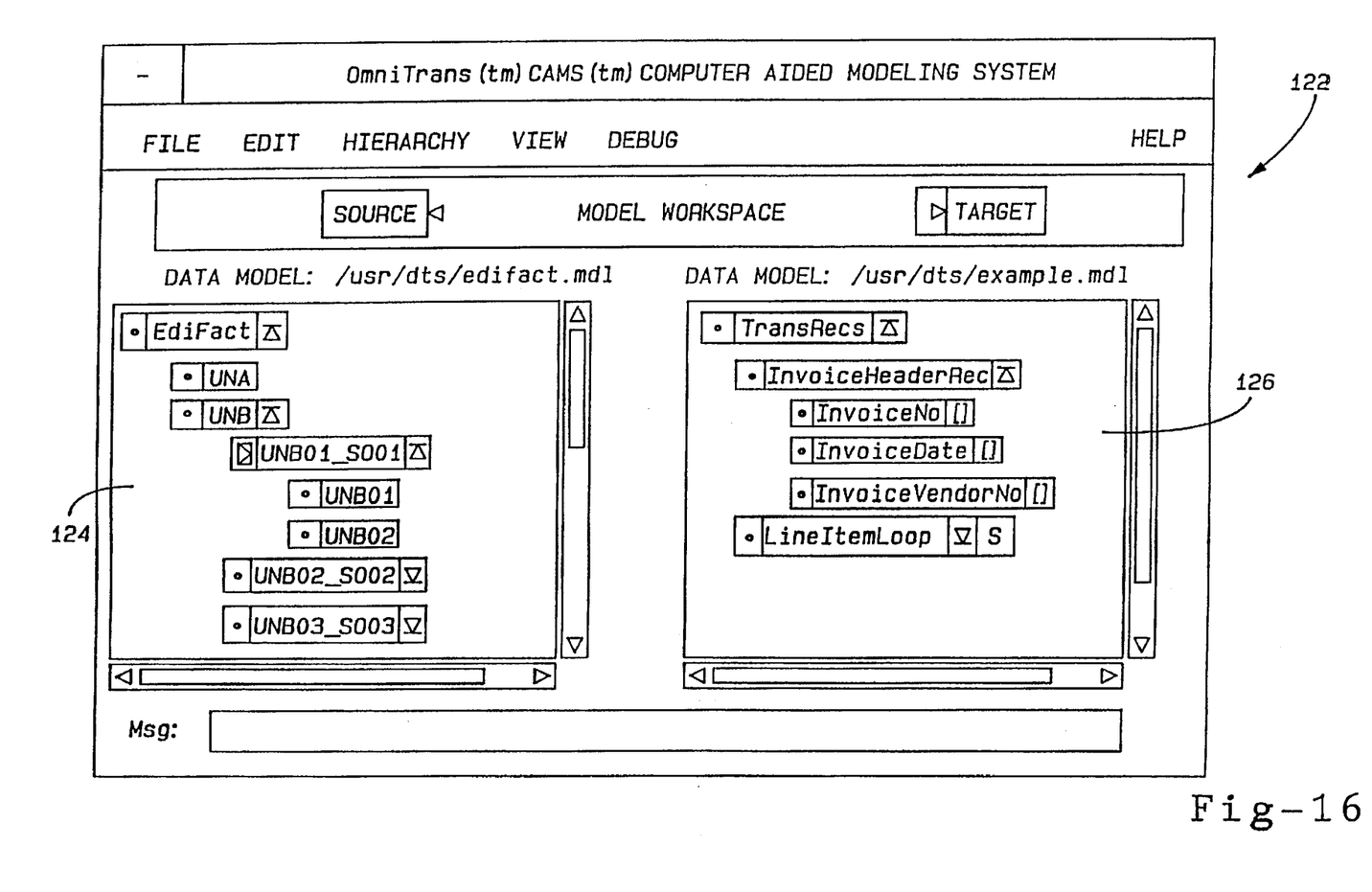
FIG. 16 is a typical graphical display showing the source and targeted data models, made in accordance with the teachings of the preferred embodiment of this invention.

Referring now to FIG. 16, there is shown a typical data screen 122, associated with a terminal 76 of the preferred embodiment of this invention. As shown, system 10, and more particularly user interface portion 72, allows access and data models, of the source and target systems, to be graphically displayed to a user and to be easily modified. These models 124, 126, as shown, may be concurrently displayed to a user in order for a user to understand the complete or entire transformation process. Moreover, the computeraided modeling portion 30 allows for single-stepped operation of a translation session, by executing a translation component that has been previously defined and stored within portion 30. In this manner, a user may run or execute a translation with the ability to set break points at which the operator may step the translation component through its operation, a single step at a time. The operator, according to the preferred embodiment of this invention, may also set various "watch points" to allow the user to modify the values given to a various object. These operations allow for a very efficient and accurate fault detection of system 10.

It should be apparent to one of ordinary skill in the art, that system 10 allows for the efficient translation of a first message having a first data format, to a second message having a second data format.

It is to be understood that the invention is not limited to the exact construction or method illustrated and described above, but that various changes and modifications may be made without departing from the spirit and scope of the invention, as defined in the following claims.

I claim:

1. A method to transform data from a first format to a second format comprising the steps of:

creating a quoted character value;

creating a numerical byte value;

creating a data value;

receiving said data;

reviewing said data for occurrences of said quoted character, numerical byte value, and data value;

counting said occurrences of said quoted characters, numerical byte values, and data value within said data;

assigning a priority value to each occurrence of said quoted characters, numerical byte values, and data values;

assigning each of said occurrences of quoted characters, numerical byte values, and data values to an array of variables; and, creating said second format by arranging said variables, within said linear array, into a format arrangement according to said assigned priority values.

2. A data interchange system adapted to transform a message having a plurality of data objects arranged in a first format into a second and a third format, said system comprising:

means for receiving said message and for recognizing, extracting, and arranging said plurality of data objects in only a single structure;

second means for providing said second and third formats;

third means for selecting said plurality of said data objects in said single structure and for arranging said selected data objects into said second and third format.

* * * * *